(12) United States Patent
Cartwright (10) Patent No.: US 7,947,181 B2
(45) Date of Patent: May 24, 2011

(54) REVERSE OSMOSIS SYSTEM (75) Inventor: Thomas Cartwright, St. Michael, MN (US)

(73) Assignee: The Good Water Company, Inc., St. Michael, MN (US)

( * ) Notice: Subject to any disclaimer, the term of this patent is extended or adjusted under 35 U.S.C. 154(b) by 0 days.

(21) Appl. No.: 12/267,184

(22) Filed: Nov. 7, 2008

(65) Prior Publication Data

US 2010/0116741 A1    May 13, 2010

(51) Int. Cl.
*B01D 61/00* (2006.01)
*B01D 63/00* (2006.01)
*B01D 35/00* (2006.01)
*C02F 9/00* (2006.01)

(52) U.S. Cl. ............ 210/652; 210/257.2; 210/134; 210/136; 210/90; 210/195.2; 210/103

(58) Field of Classification Search .......... 210/652, 210/257.2, 195.2, 90, 136, 134, 97, 103, 210/195.1
See application file for complete search history.

(56) References Cited

U.S. PATENT DOCUMENTS

| | | | |
|---|---|---|---|
| 3,856,676 A | 12/1974 | Grimme et al. | |
| 4,350,587 A | 9/1982 | Jarrell | |
| 4,650,586 A * | 3/1987 | Ellis, III | 210/636 |
| 4,761,295 A | 8/1988 | Casey | |
| 4,770,770 A | 9/1988 | Regunathan et al. | |
| 4,853,117 A * | 8/1989 | Burrows | 210/110 |
| 4,906,372 A | 3/1990 | Hopkins | |
| 5,059,317 A | 10/1991 | Marius et al. | |
| 5,093,012 A | 3/1992 | Bundy et al. | |
| 5,358,635 A | 10/1994 | Frank et al. | |
| 5,451,314 A | 9/1995 | Neuenschwander | |
| 5,460,716 A | 10/1995 | Wolbers | |
| 5,795,471 A | 8/1998 | Naito | |
| 5,928,503 A | 7/1999 | Shang-Chun | |
| 6,001,244 A * | 12/1999 | Salter et al. | 210/104 |
| 6,068,764 A | 5/2000 | Chau | |
| 6,099,735 A | 8/2000 | Kelada | |
| 6,146,524 A | 11/2000 | Story | |
| 6,190,558 B1 * | 2/2001 | Robbins | 210/652 |
| 6,228,255 B1 * | 5/2001 | Peterson et al. | 210/90 |
| 6,258,265 B1 | 7/2001 | Jones | |

(Continued)

FOREIGN PATENT DOCUMENTS

JP    11-290837    10/1999

(Continued)

OTHER PUBLICATIONS

Non-Final Office Action dated Nov. 4, 2009 for U.S. Appl. No. 12/470,337.

*Primary Examiner* — Ana M Fortuna
(74) *Attorney, Agent, or Firm* — Duane Morris LLP (57) ABSTRACT

An apparatus for purifying water according to one embodiment of the present invention may include a feed line fluidically connected to a reverse osmosis module containing a semipermeable membrane. The semipermeable membrane produces purified water and a concentrate. A drain line is also connected to the reverse osmosis module configured to transport concentrate. A product line is connected to the reverse osmosis module for transporting purified water. Operatively associated with the product line and drain line is a shut-off mechanism containing a pressure sensor operatively associated with an appliance configured to activate the shut-off mechanism.

19 Claims, 10 Drawing Sheets

U.S. PATENT DOCUMENTS

| | | |
|---|---|---|
| 6,299,779 B1 | 10/2001 | Pattee |
| 6,334,951 B1 * | 1/2002 | Cheng .......................... 210/110 |
| 6,681,584 B1 | 1/2004 | Conner |
| 6,702,942 B1 | 3/2004 | Nield |
| 7,264,731 B2 | 9/2007 | Bosko |
| 7,402,240 B2 * | 7/2008 | Kung et al. ................... 210/110 |
| 7,513,996 B2 * | 4/2009 | Kloos et al. ................. 210/257.2 |
| 7,550,084 B2 * | 6/2009 | Schmitt ....................... 210/257.2 |
| 7,597,807 B2 | 10/2009 | Sieth et al. |
| 7,598,807 B2 * | 10/2009 | Takagi .......................... 330/261 |
| 2002/0170858 A1 | 11/2002 | Maddux et al. |
| 2003/0034305 A1 | 2/2003 | Luehmann et al. |
| 2004/0245175 A1 * | 12/2004 | Godec et al. .................. 210/639 |
| 2005/0040087 A1 | 2/2005 | Jacuzzi |
| 2005/0150843 A1 | 7/2005 | Berthold |
| 2005/0183999 A1 | 8/2005 | Hackett et al. |

FOREIGN PATENT DOCUMENTS

WO    WO 2004/014528    *    2/2004

* cited by examiner

REVERSE OSMOSIS SYSTEM

FIELD OF THE INVENTION

The present invention relates to reverse osmosis systems in general and, specifically, to direct feed reverse osmosis systems for appliances.

BACKGROUND OF THE INVENTION

Various types of reverse osmosis ("RO") systems are used to purify water, generally by removing dissolved impurities and particles larger than about 1.0 angstrom (0.0001 micron). While on one hand, osmosis processes cause a solution with low concentration to diffuse through a semipermeable membrane to a solution with higher concentration until equilibrium is reached, on the other hand, RO processes apply pressure causing a highly-concentrated solution to flow through a semipermeable membrane to a less concentrated solution until the pressure is no longer applied. To cause flow across the semipermeable membrane, however, the applied pressure must be used to overcome osmosis.

In addition to semipermeable membranes, a typical RO system may include prefilters. Sediment prefilters have been used to extend the life of the RO semipermeable membrane by removing suspended sediment to reduce fouling, while carbon filters assist RO membranes in removing chlorine, chloramines, and volatile organic compounds from water. Multiple prefilters, such as Kinetic Degradation Fluxion ("KDF") filters with carbon filters, may also be used to remove heavy metals and reduce chlorine/chloramine accumulation.

Existing RO systems are not without their problems, however. For example, storage tanks of the typical system create undesirable back pressure, which must be alleviated by a booster pump. Storage tanks and booster pumps require extra maintenance and extra space that is often at a premium for most RO systems. Moreover, storage tanks and booster pumps decrease efficiency by significantly increasing total input into the system while maintaining constant output. While RO systems attempt to provide purified water efficiently, none have achieved success.

BRIEF SUMMARY OF THE INVENTION

Apparatus for purifying water according to one embodiment of the invention includes a feed line providing unpurified water, which is fluidically connected to a reverse osmosis module. A semipermeable membrane is contained within the reverse osmosis module for producing purified water and a concentrate. A drain line is connected to the reverse osmosis module and configured to transport concentrate. Further included is a product line directly connected to the reverse osmosis module for transporting purified water. Additionally, a shut-off mechanism is operatively associated with the product line and drain line. The shut-off mechanism contains a pressure sensor configured to activate the shut-off mechanism. Finally, the apparatus includes an appliance directly connected to the product line and operatively associated with the pressure sensor.

A method for purifying water may include: initiating a flow of unpurified water by creating a pressure drop across a reverse osmosis system; producing purified water and a concentrate by directing unpurified water through a semipermeable membrane; and stopping production of purified water by increasing pressure across the reverse osmosis system.

BRIEF DESCRIPTION OF THE DRAWINGS

Illustrative and exemplary embodiments of the invention are shown in the drawings in which.

DETAILED DESCRIPTION OF THE INVENTION

The present invention comprises RO system 10 and method 100 for purifying water, which can produce about 0.9 to about 15.1 liters/minute (about 0.25 to about 4.0 gallons/minute) of purified water 40.

Figure 1:
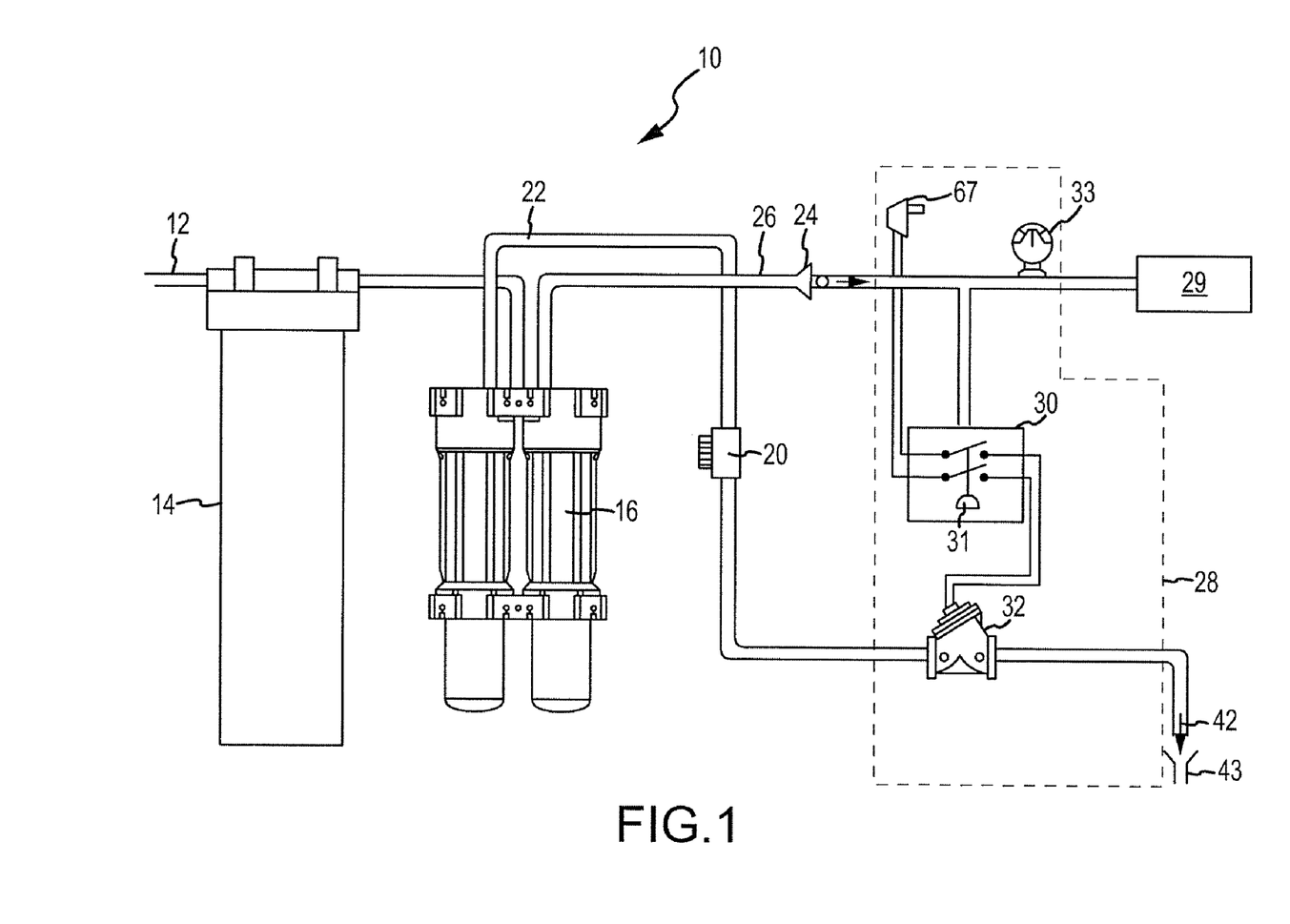
FIG. 1 shows a schematic representation of a reverse osmosis system directly connected to an appliance according to one embodiment of the invention.

RO system 10 will now be described in greater detail with reference to the embodiment illustrated in FIG. 1. RO system 10 includes prefilter 14, RO module 16, RO cartridge 18, RO semipermeable membrane 48, and shut-off mechanism 28. RO system 10 may increase production by having cartridge 18 directly connected to appliance 29 and shut-off mechanism 28. RO system 10 comprises a feed line 12, an inlet end of which is connected to a water supply (not shown) which may be a well, municipal water supply, or other water supply as may be familiar to one of ordinary skill in the art after becoming familiar with the teachings of the present invention. An outlet end of feed line 12 is also connected to prefilter 14 that screens out heavy transition metals, chlorine, chloramines, and sediments. Filtering out larger contaminants using prefilter 14 may extend the life of RO cartridge 18 (FIG. 6) within RO module 16. RO system 10 also comprises flow control 20, check valve 24, and pressure gauge 33. Flow control 20 is connected to drain line 22 and check valve 24 is connected to product line 26. An optional check valve 24 can additionally be added to drain line 22. Pressure gauge 33 is connected to product line 26 and may be used to calibrate RO system 10.

Connected to both drain line 22 and product line 26 is shut-off mechanism 28. In one embodiment as shown in FIG. 1, shut-off mechanism 28 comprises a pressure switch 30 and solenoid valve 32. Pressure switch 30 is connected to pressure sensor 31 and is operatively associated with shut-off mechanism 28. Pressure sensor 31 is also configured to activate shut-off mechanism 28. Additionally, pressure sensor 31 may be operatively associated with appliance 29 such as ice machines, coffee and tea machines, other beverage dispensers, evaporative coolers, and aquariums, i.e. appliances known to be associated with point of use water filtration systems and therefore known as point of use appliances. Turning on appliance 29 may cause a pressure drop across RO system 10, thereby activating shut-off mechanism 28 through operation of pressure sensor 31 and pressure switch 30 as is explained in more detail below. By using shut-off mechanism 28 with RO semipermeable membrane 48, RO system 10 maintains an outlet pressure similar to its inlet pressure. Having similar outlet and inlet pressures under certain conditions allows RO system 10 to work effectively, without booster pumps, for most appliances 29.

Figure 2:
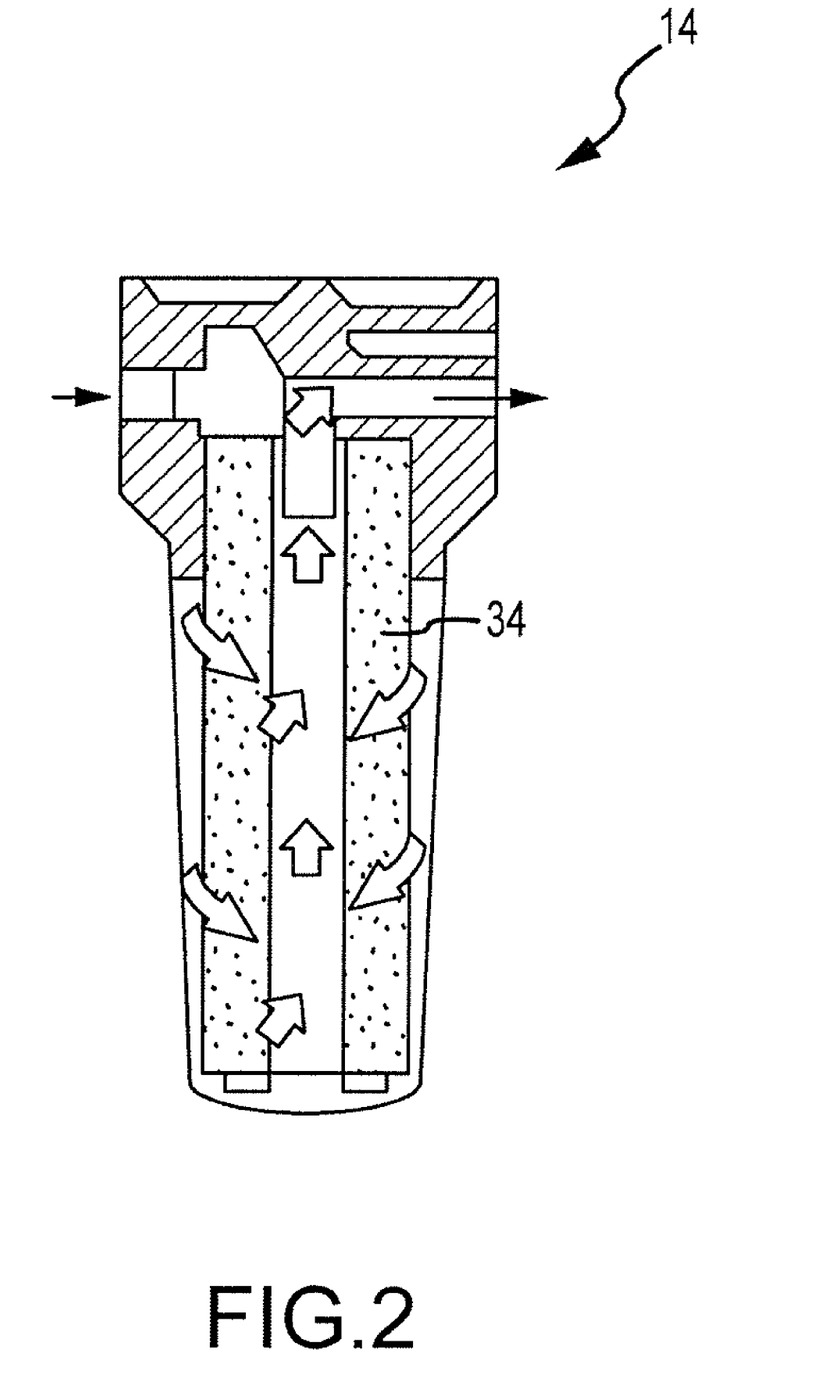
FIG. 2 shows a cross-section view of a carbon filter.
Figure 3:
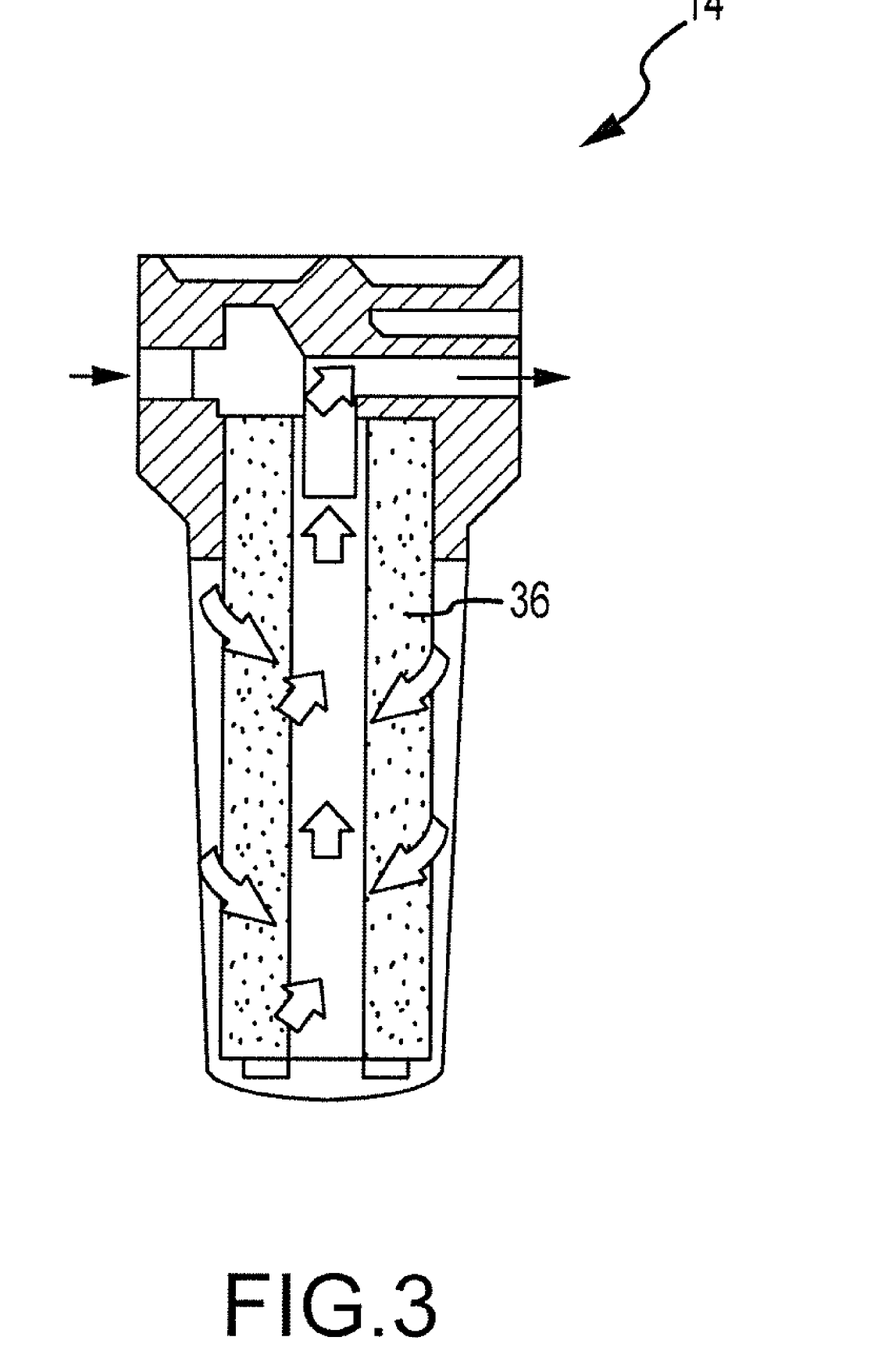
FIG. 3 shows a cross-section view of a KDF filter.
Figure 6:
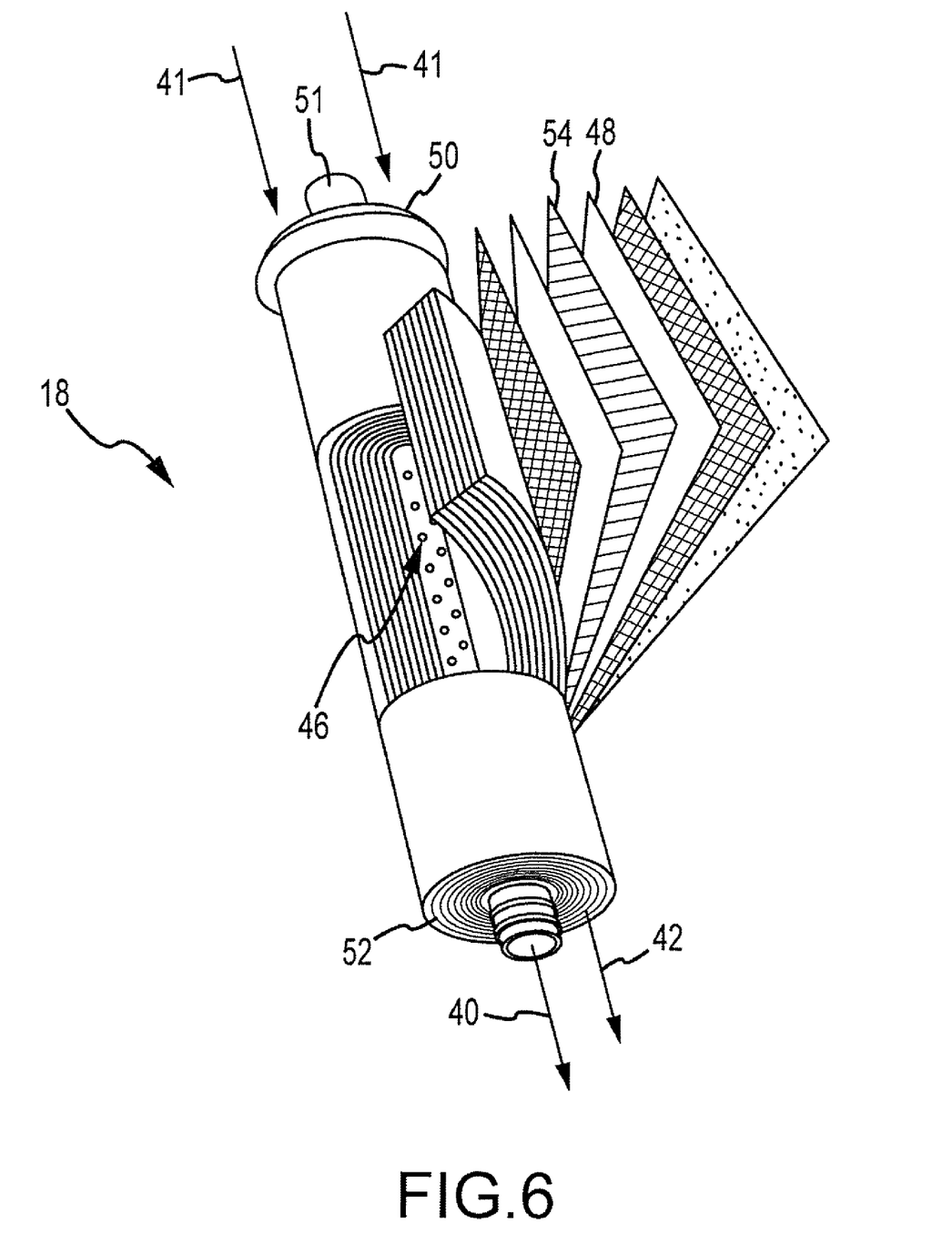
FIG. 6 shows a cross-section view of a RO semipermeable membrane.

Referring to FIGS. 2 and 3, prefilter 14 will now be described in greater detail. Prefilter 14 may comprise a carbon filter 34 or KDF filter 36, although other prefilters may be used. Carbon filter 34 may comprise activated carbon; KDF filter 36 may comprise carbon zinc alloy. Carbon filter 34 can additionally incorporate KDF filter 36 or may be used in series with KDF filter 36 or in any other fashion familiar to one having ordinary skill in the art. Prefilter 14 assists RO semipermeable membrane 48 by removing contaminants in unpurified water 41, such as larger particles, chlorine, chloramines, sediment, heavy metals, and volatile organic compounds, before unpurified water 41 enters RO module 16 and therefore may extend the life of RO semipermeable membrane 48 (FIG. 6). Without prefilter 14, semipermeable membrane 48 may be more susceptible to fouling and oxidizers, such as transition metals, chlorine, and chloramines, that may cause RO semipermeable membrane 48 to deteriorate. Other combinations of prefilter 14 may be used to target particular contaminants; polypropylene filters, for example, may be used to remove extra fine sand, dirt, silt, or rust. Variations of prefilter 14 may be used as would become apparent to persons having ordinary skill in the art after having become familiar with teachings provided herein. Consequently, the present invention should not be regarded as limited to a particular type of prefilter 14.

Figure 4:
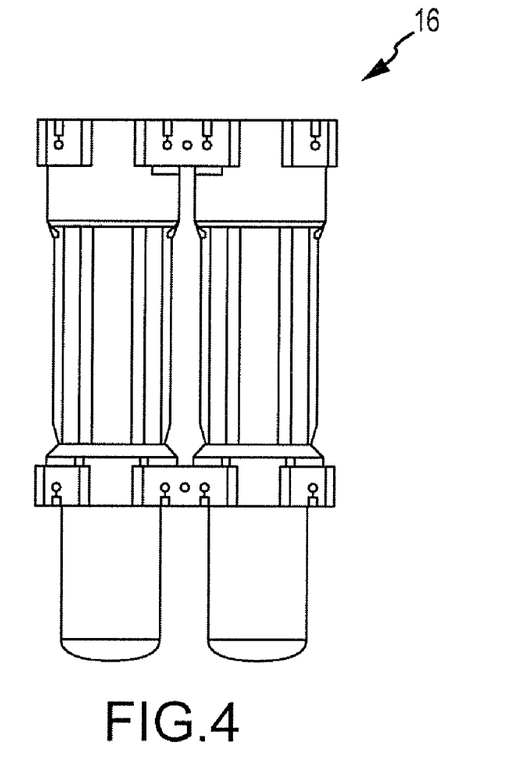
FIG. 4 shows a side view of a RO module.
Figure 5:
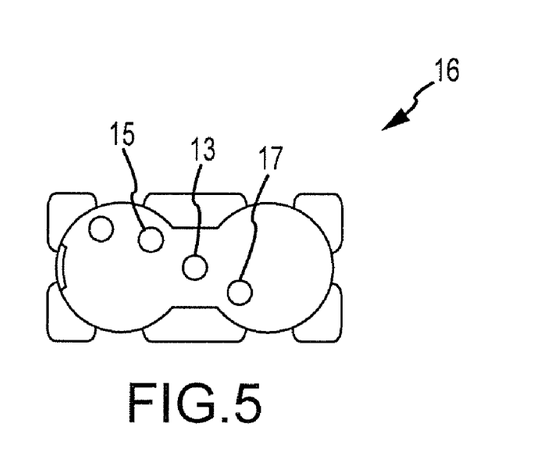
FIG. 5 shows a top view of a RO module.

Referring to FIGS. 4 and 5, in one embodiment, RO module 16 comprises feed line inlet 13, drain line outlet 15, and product line outlet 17. Feed line inlet 13, drain line outlet 15, and product line outlet 17 are configured to allow for production of purified water 40 and concentrate 42 by RO semipermeable membrane 48 (FIG. 6). Feed line inlet 13 directs unpurified water 41 to RO semipermeable membrane 48 (in the direction of arrows shown). Cap 51 prevents unpurified water 41 from entering central perforated tube 46 before contacting semipermeable membrane 48, as shown in FIG. 6. Concentrate 42 exits RO module 16 through drain line outlet 15 into drain 43 as purified water 40 simultaneously exits RO module 16 through product line outlet 17. Concentrate 42 comprises water containing contaminates. RO module 16, in one embodiment, is constructed of Noryl®, a blend of polyphenylene oxide and polystyrene commercially available on the internet and developed by General Electric®.

As shown in FIG. 6, RO semipermeable membrane 48 is layered between spacers 54 and spiral wound around central perforated tube 46. Unpurified water 41 from feed line inlet 13 enters first portion 50 of RO cartridge 18 and permeates through RO semipermeable membrane 48 and spacers 54 to central perforated tube 46, which is capped by cap 51 at first portion 50 to prevent unpurified water 41 from entering central perforated tube 46.

Figure 7:
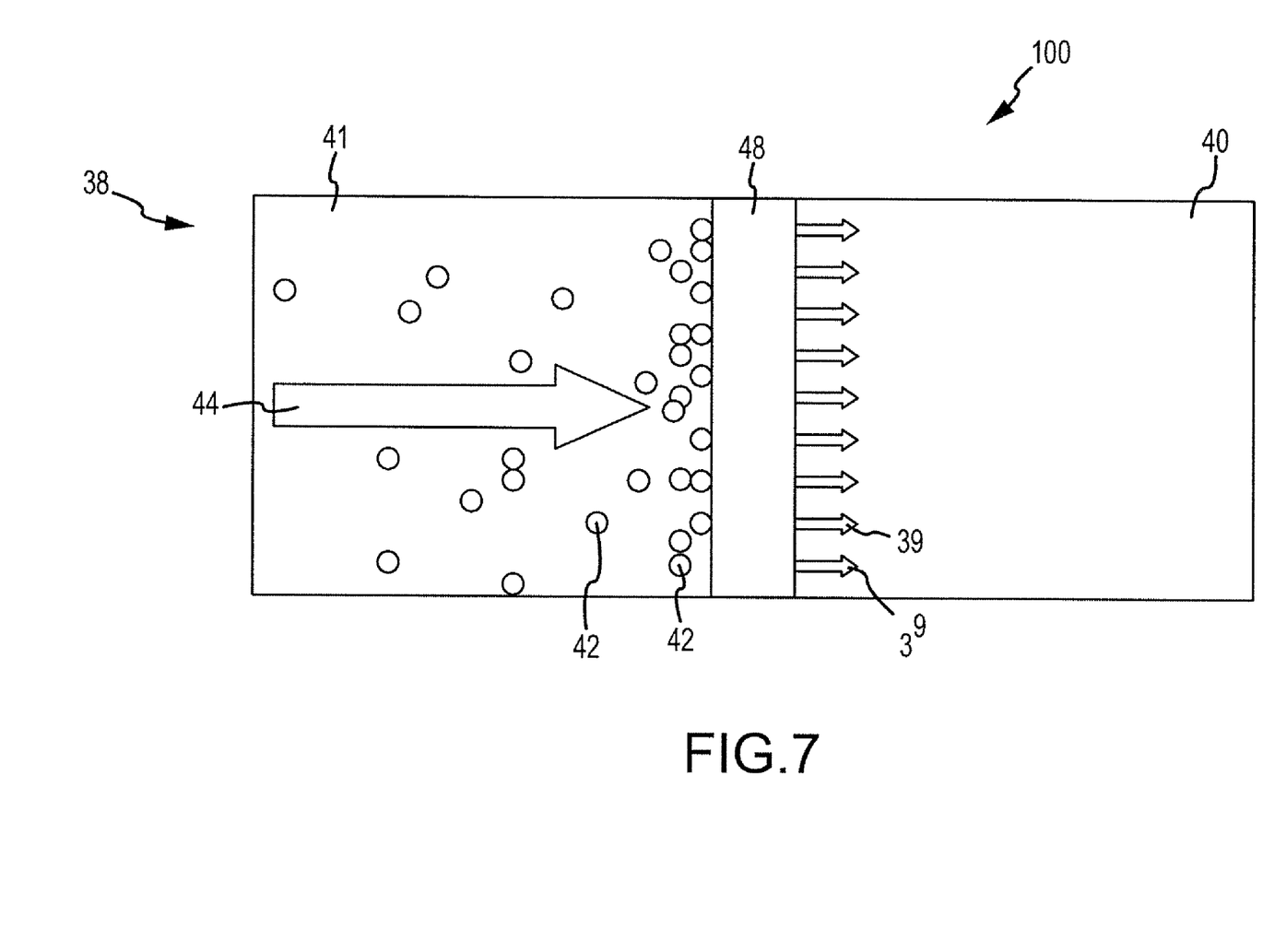
FIG. 7 shows a side view of a RO process.

As will be explained in greater detail below, method 100 may comprise RO process 38 in which pressure 44 overcomes osmosis and causes unpurified water 41 to permeate through RO semipermeable membrane 48. As illustrated in FIG. 7, flow through RO semipermeable membrane 48 (as shown by arrow 39) produces concentrate 42 and purified water 40.

Returning to FIG. 6, once unpurified water 41 enters central perforated tube 46, it becomes purified water 40 because it has been filtered by semipermeable membrane 48. Purified water 40 exits second portion 52 of RO cartridge 18 through central perforated tube 46. One advantage of winding semipermeable membrane 48 around perforated tube 46 is an increase in membrane area per unit volume, thereby improving flow rate and efficiency in removing contaminants. Spacers 54 may promote turbulent flow that decreases membrane fouling by keeping unpurified water 41 velocities, pressures, and other flow quantities constantly and randomly fluctuating. Contaminants within water are, thus, unable to settle and foul semipermeable membrane 48.

In embodiments shown and described herein, RO cartridge 18 is the Merlin® Reverse Osmosis Membrane Element, which is commercially available through the internet. Various types of RO cartridges 18, nevertheless, can be used as would become apparent to persons having ordinary skill in the art after having become familiar with teachings provided herein. Consequently, the present invention should not be limited to a particular type of RO cartridge 18.

Together, semipermeable membrane 48 and prefilter 14 remove from unpurified water 41 a plurality of contaminants, such as various salts, oxidation chemicals, and organics, as shown in Table 1.

TABLE 1

Contaminants Removed by the RO System 10
CONTAMINANTS

| | | | |
|---|---|---|---|
| Radium 226 | Sodium | Bacteria | Chromium III |
| Radium 228 | Copper | Herbicides/Pesticides | Chromium VI |
| Crypto virus | Arsenic V | Sulfur | Fluoride |
| Giardia virus | Nitrates/Nitrites | Hydrogen sulfide | Cadmium |
| Calcium++ | Barium | Ammonia | Mercury |
| Magnesium++ | Lead | Chlorine/Chloramines | Iron++ |

Figure 8:
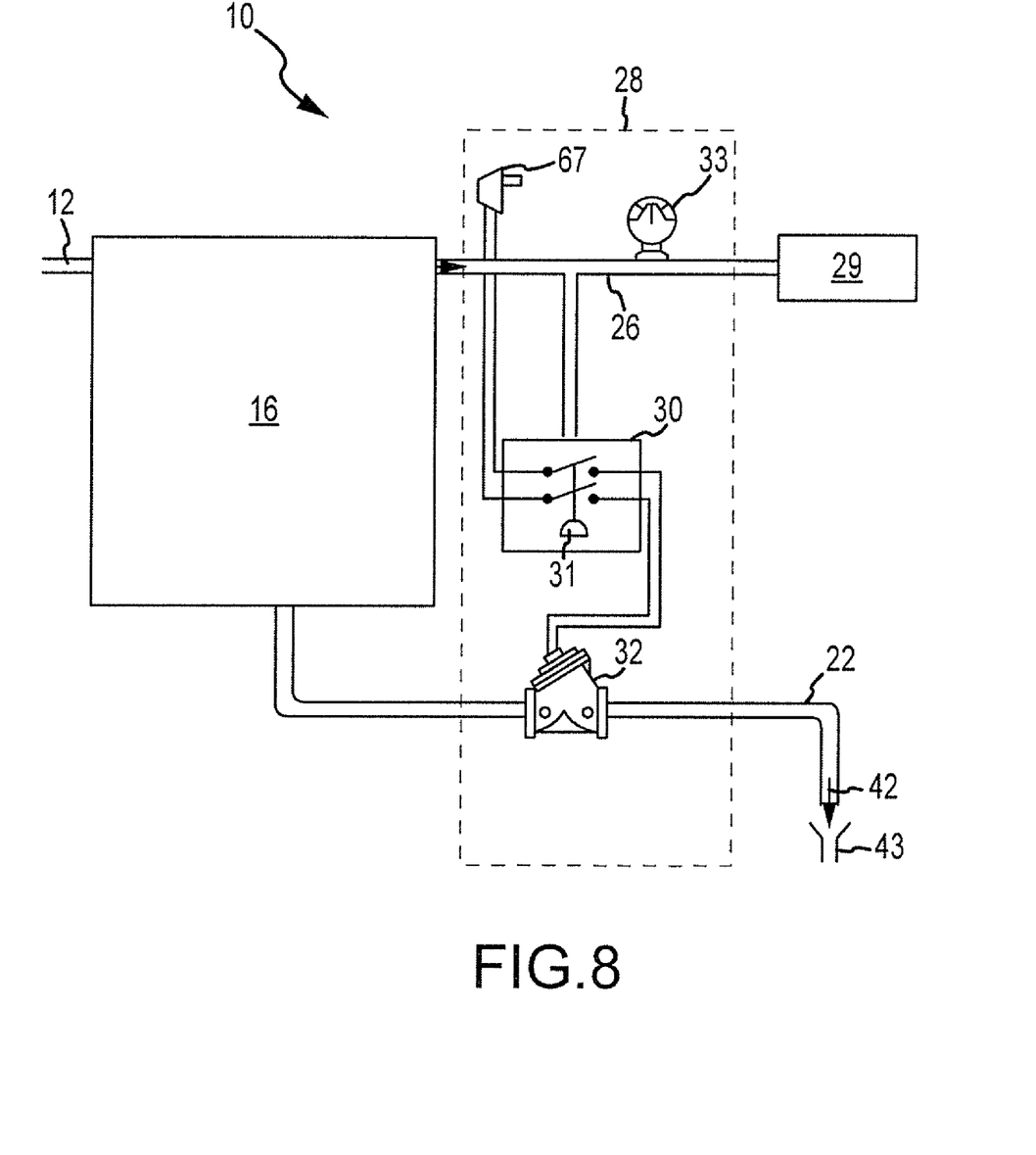
FIG. 8 is a schematic representation of the shut-off mechanism.

The initiation of the flow of unpurified water 41 into RO system 10 is caused by activating shut-off mechanism 28. With reference to FIG. 8, shut-off mechanism 28 is connected to both drain line 22 and product line 26. As pressure changes across RO system 10 occur, shut-off mechanism 28 automatically stops or starts production of purified water 40. When pressure drops, shut-off mechanism 28 automatically starts production of purified water 40 by initiating flow of unpurified water 41 into RO system 10 through feed line 12. In an embodiment shown in FIG. 1, the pressure drop may be initiated by turning on appliance 29. In another embodiment, the pressure drop may be initiated by opening a spigot (not shown) connected to an outlet end of product line 26.

Use of shut-off mechanism 28 in conjunction with semipermeable membrane 48 may create more efficient production of purified water 40, maintaining flow rates between about 0.9 to about 15.1 liters/minute (about 0.25 to about 4.0 gallons/minute) without use of storage tank or booster pump. Additionally, an efficiency ratio of purified water 40 to unpurified water 41 may be obtained between about 33% and about 60%. Unlike typical shut-off mechanisms connected to storage tanks, shut-off mechanism 28 also may be used with inlet pressures ranging between about 207 kPa and about 690 kPa (about 30 psi and about 100 psi), without a booster pump, depending on the temperature and presence of total dissolved solids (TDS) in unpurified water 41.

Shut-off mechanism 28 will now be described with reference to one embodiment of RO system 10 in which appliance 29 comprises an ice machine with a capacity between about 22.7 to about 45.4 kg (about 50 to about 100 lbs). In that embodiment, shut-off mechanism 28 may be used without a booster pump given inlet pressure in a range of about 345 kPa and about 690 kPa (about 50 psi to about 100 psi), water temperature in a range of about 10° and about 38° C. (about 50° and about 100° F.), and inlet TDS of between about 200 and about 2,000 parts per million (ppm). The higher the ppm of TDS, the higher the temperature and the pressure necessary to maintain adequate flow through RO system 10 as shown in Table 2:

TABLE 2

Inlet TDS/Inlet Temperature/Inlet Pressure

| Inlet TDS | Inlet Temperature | | | | | | | |
|---|---|---|---|---|---|---|---|---|
| | 35 | 40 | 50 | 60 | 70 | 80 | 90 | 100 |
| 2000 | | | | | | | | |
| 1800 | | | | | | | | |
| 1600 | | | | | | | | |
| 1400 | | | | | | | | |
| 1200 | | | | | | | | |
| 1000 | | | | | | | | |
| 800 | | | | | | | | |
| 600 | | | | | | | | |
| 400 | | | | | | | | |
| 200 | | | | | | | | |
| 0 | | | | | | | | |
| | 30 | 40 | 50 | 60 | 70 | 80 | 90 | 100 |

Inlet Pressure

: Booster Pump Required;
: Booster Pump Recommended;
: No Booster Pump Required

Additionally, without storage tanks, RO system 10 is much smaller than conventional systems.

Figure 9:
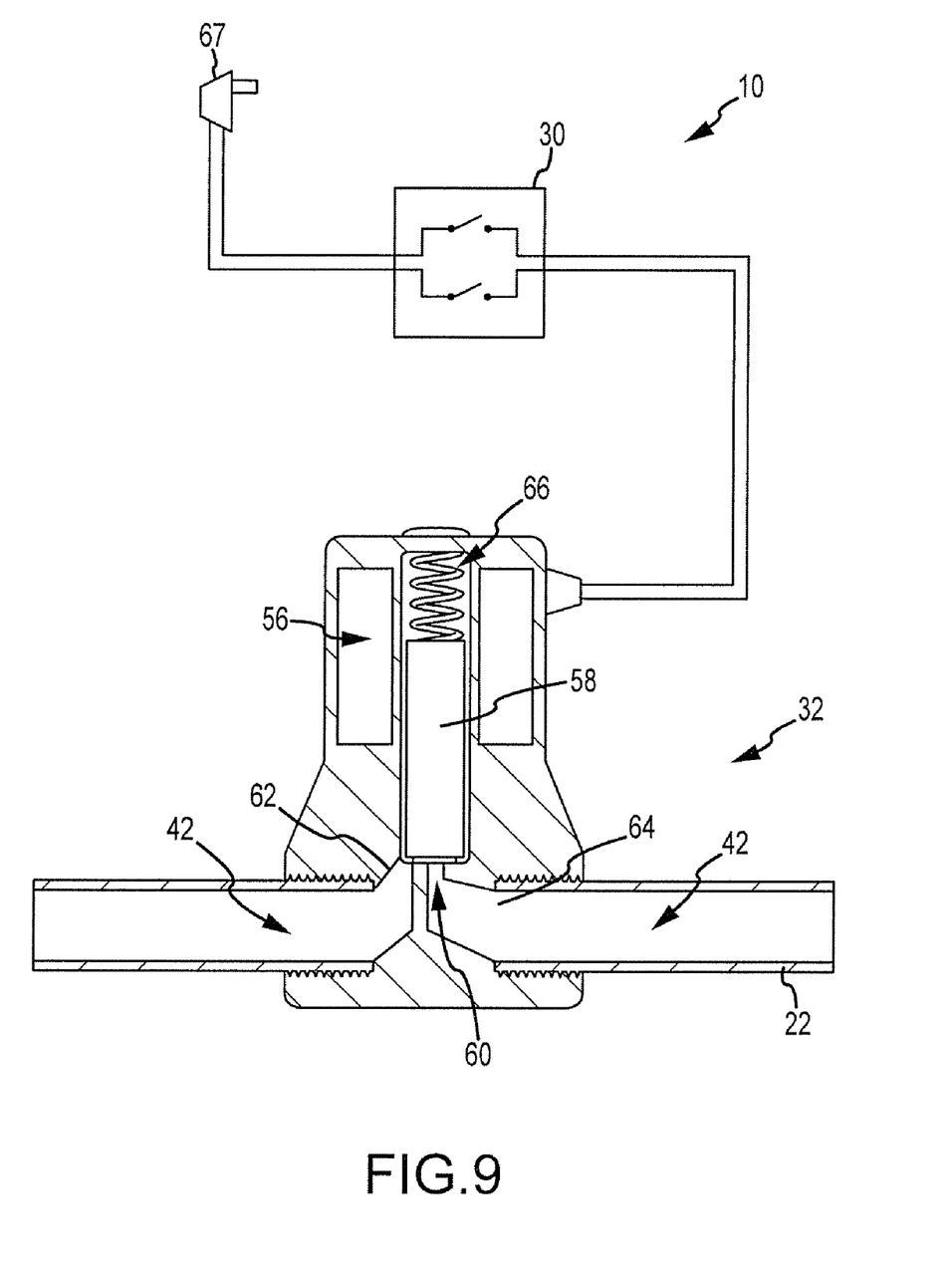
FIG. 9 shows a cross-section view of a solenoid.

Shut-off mechanism 28 further includes solenoid valve 32 illustrated in FIG. 9. In one embodiment, solenoid value 32 may comprise an electromechanical device activated by pressure switch 30. Upon activation, current is sent to coil 56 creating a magnetic field. The field draws plunger 58 away from solenoid orifice 60 to overcome solenoid spring 66. As plunger 58 moves away from solenoid orifice 60, concentrate 42 flows through solenoid inlet 62 into solenoid outlet 64. When solenoid valve 32 is not activated plunger 58 is positioned within solenoid orifice 60, thus restricting flow of concentrate 42. Solenoid valve 32 may be used with adaptor 67 for both direct current ("DC") and alternating current ("AC"). In FIG. 8, solenoid valve 32 is connected to 24 Volt-AC adaptor 67. Solenoid valve 32 can additionally be made to work with almost any applied voltage. Although, common voltage use with solenoids ranges from 6 Volt-DC to 24 Volt-DC and 24 Volt-AC to 240 Volt-AC. In one embodiment, the solenoid valve 32 is part #075-DC manufactured by Rain Bird.

Figure 10:
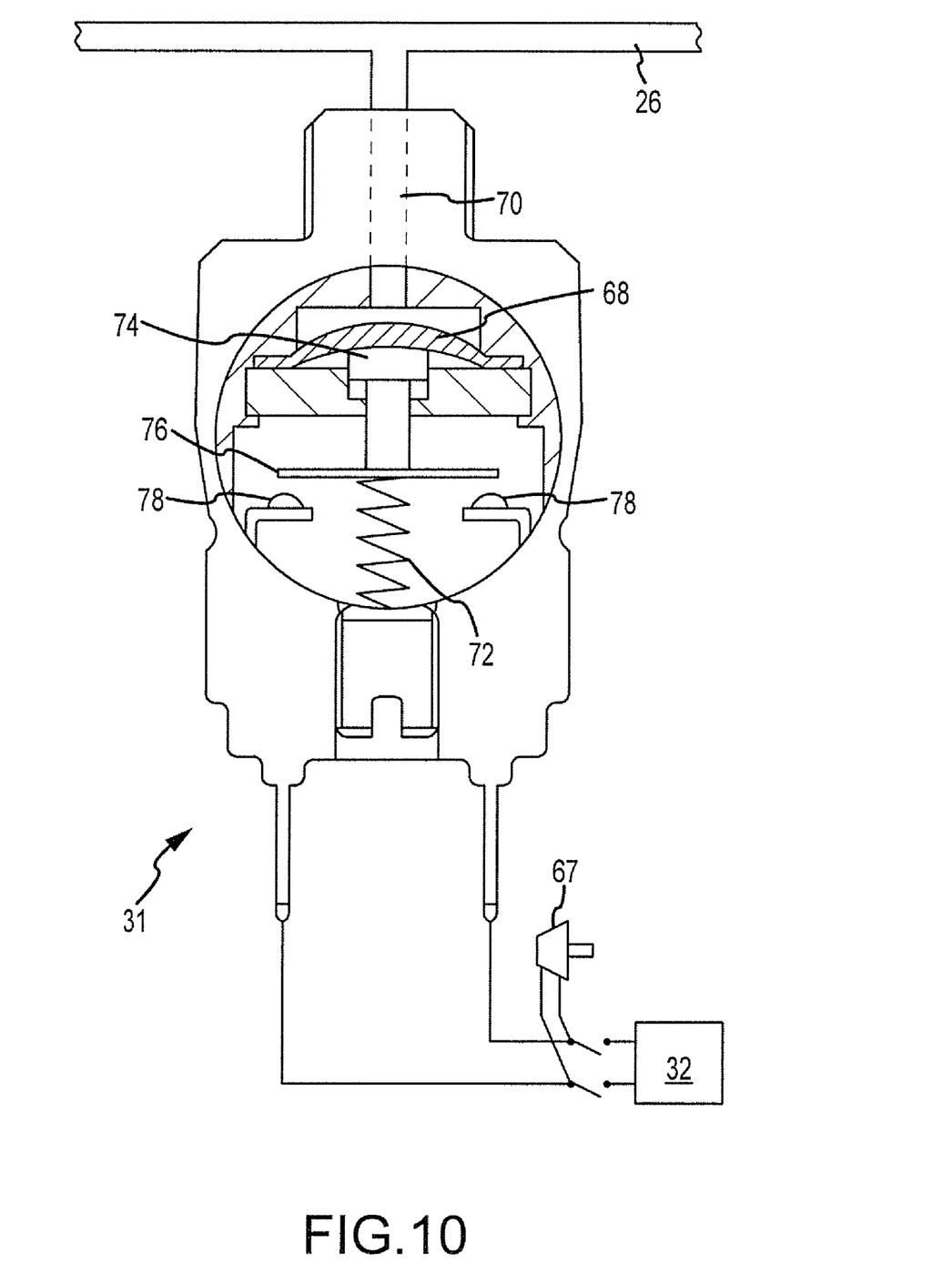
FIG. 10 shows a cross-section view of a pressure switch.

Now referring primarily to FIG. 10, pressure sensor 31 and pressure switch 30 will now be described. In one embodiment, pressure sensor 31 is operatively associated with pressure switch 30. As shown, Pressure sensor 31 comprises a diaphragm 68, pressure sensor orifice 70, preloaded compression spring 72, pressure sensor piston 74, contact disk 76, and pressure sensor contacts 78. When pressure increases within product line 26 and pressure sensor orifice 70 during production of purified water 40, a force is applied to diaphragm 68. In one embodiment, in which RO system 10 is connected directly to appliance 29, pressure may be increased by deactivating, or turning off, appliance 29. If the applied force is greater than opposing force exerted by preloaded compression spring 72, then pressure sensor piston 74 moves contact disk 76. Once contact disk 76 touches pressure sensor contacts 78, a circuit is closed, causing current to pass through pressure sensor 31, thereby activating pressure switch 30 and solenoid valve 32, stopping production of purified water 40.

Pressure sensor 31 operates in the opposite manner when pressure drops across RO system 10, such as would occur when appliance 29 is turned on.

Pressure sensor 31 may be advantageous in terms of system efficiency. In the embodiments shown, pressure sensor 31 activates pressure switch 30 to start or stop production of purified water 40. Pressure sensor 31 therefore is able to quickly react to system requirements by automatically triggering solenoid valve 32 and thus reduce waste.

In one embodiment, efficiency of RO system 10 may be further increased by directly connecting the outlet end of product line 26 to appliance 29. Activating appliance 29 automatically creates the pressure drop across RO system 10. When pressure sensor 31 senses the pressure drop across RO system 10, pressure switch 30 is automatically activated, which in turn activates solenoid valve 32 to start production of purified water 40. Turning the appliance 29 off has the opposite affect, increasing the pressure across the RO system 10 and stopping the production of purified water 40 through the operation of pressure sensor 31, pressure switch 30 and solenoid valve 32. An advantage of directly connecting appliance 29 to RO module 16 via product line 26 is eliminating the interference and lag time attributable to a storage tank connected to a booster pump.

The present invention comprises method 100 for purifying water. In one embodiment, method 100 may comprise producing purified water 40 and concentrate 42 through RO process 38.

Figure 11:
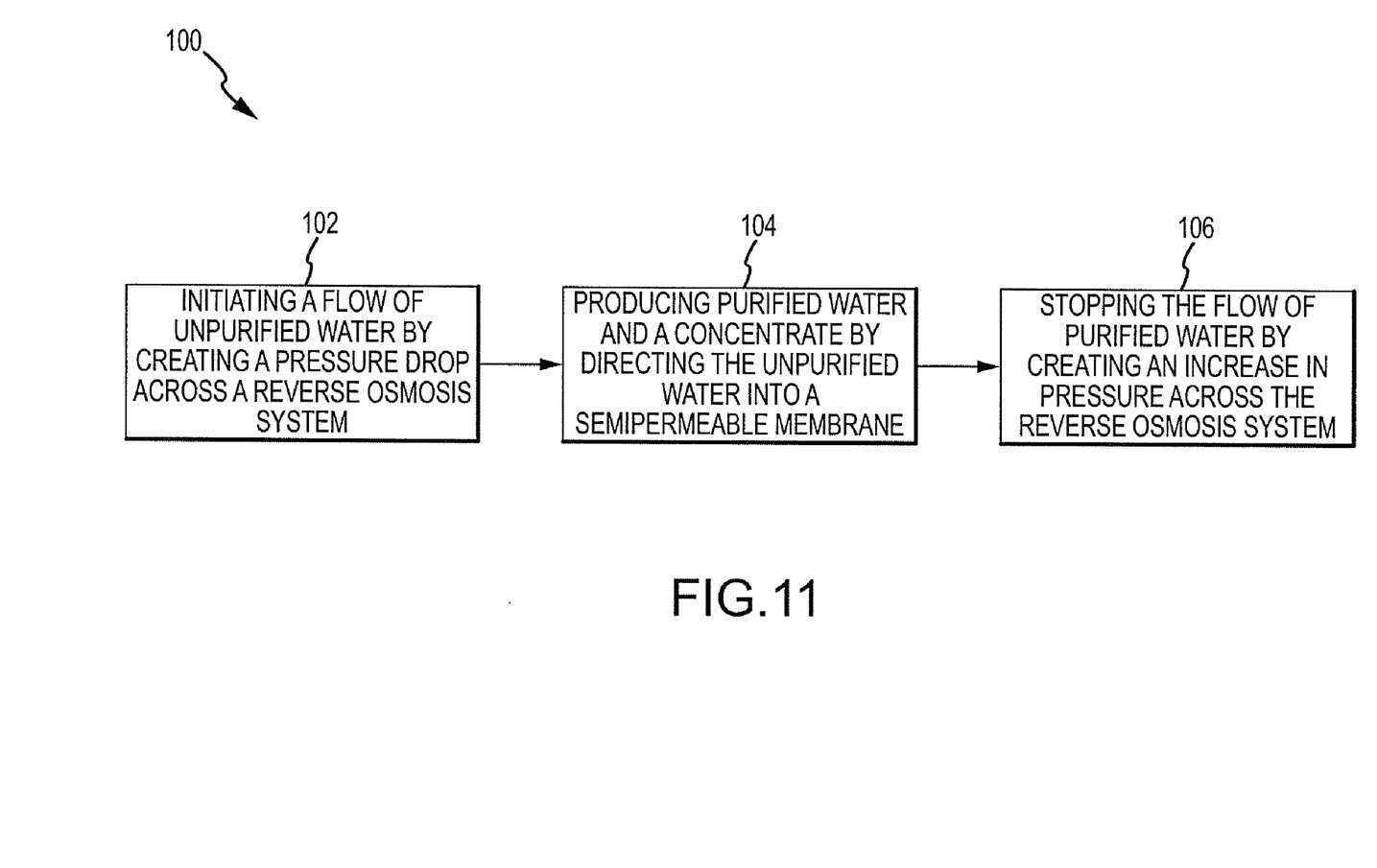
FIG. 11 illustrates a method for purifying water according to one embodiment of the invention.

In another embodiment illustrated in FIG. 11, method 100 for purifying water comprises initiating flow of unpurified water 41 by creating a pressure drop across a reverse osmosis system 10 (step 102). This may be accomplished by activating the solenoid valve 32 thereby opening drain line 22. In addition, the flow of purified water may be supplied in a range of about 207 kPa to about 690 kPa (about 30 psi to about 100 psi), as previously described. Method 100 also includes producing purified water 40 and concentrate 42 by directing unpurified water 41 into RO semipermeable membrane 48 (step 104), as well as stopping flow of purified water 40 by creating an increase in pressure across reverse osmosis system 10 (step 106). Method 100 may further comprise draining concentrate 42.

In an embodiment in which the RO module 16 is connected to appliance 29 via product line 26, method 100 may comprise creating the pressure drop and initiating the flow of unpurified water 41 by activating appliance 29. Method 100 may further comprise providing purified water 40 directly to appliance 29 without having to store purified water 40 or without having to pump purified water 40, or both. Method 100 may also comprise draining the concentrate 42. Further, turning off, or deactivating, appliance 29, causes pressure to increase across RO system 10, thereby stopping the flow of unpurified water 41 into feed line 12, thereby stopping production of purified water 40, as well as concentrate 42.

RO system 10 and method 100 may efficiently produce about 0.9 to about 15.1 liters/minute (about 0.25 to about 4.0 gallons/minute) of purified water 40. While other systems and methods require use of storage tanks and booster pumps, RO system 10 and method 100 maintain high production rates at low inlet pressures without storage tanks and booster pumps. Directly connecting (i.e., without storage tank(s)) semipermeable membrane 48 to appliance 29 and operatively associating shut-off mechanism 28 with drain line 22 and product line 26 may significantly reduce waste, while maintaining efficiency ratios of purified water 40 to unpurified water 41 between about 33% and about 60%. Also, by directly connecting semipermeable membrane 48 to appliance 29, RO system 10 may be used with inlet pressures ranging between about 207 kPa and about 690 kPa (about 30 psi and about 100 psi), without a booster pump.

Having thoroughly described RO system 10 and method 100 according to the present invention, it should be noted that the foregoing description has been presented for purposes of illustration and description of the present invention. It is not intended to be exhaustive or to limit the invention to the precise embodiments disclosed. For example, embodiments shown and described herein use a spiral wound RO semipermeable membrane 48 in combination with an automatic shut-off mechanism 28 comprising a pressure switch 30, pressure sensor 31, and solenoid valve 32. Although, other combinations of semipermeable membranes, and various combinations of shut-off mechanisms comprising different types of pressure switches, pressure sensors, and solenoid valves may be used for this purpose. Consequently, the present invention should not be limited to particular RO semipermeable membrane 48 and shut-off mechanism 28 components described herein. Having herein set forth various embodiments of the present invention, it is anticipated that modifications and variations will naturally occur to those of skill in the art after becoming familiar with the present invention. It is anticipated that such suitable modifications will nonetheless remain within the scope of the invention. The invention shall therefore be construed in accordance with the following claims.

What is claimed is:

1. Apparatus for purifying water, comprising:
   a feed line for providing unpurified water, the feed line being fluidically connected to a reverse osmosis module;
   a semipermeable membrane contained within the reverse osmosis module, the semipermeable membrane for producing purified water and a concentrate;
   a drain line connected to the reverse osmosis module, the drain line being configured to transport the concentrate;
   a product line directly connected to the reverse osmosis module, the product line for transporting the purified water;
   an appliance directly connected to the product line;
   a shut-off mechanism containing a pressure sensor, the pressure sensor including a diaphragm, pressure sensor contacts and a contact disk and being configured to activate the shut-off mechanism responsive to a pressure increase in the product line when the appliance is off, by causing the contact disk to contact the pressure sensor contacts thereby activating a solenoid valve that shuts off the reverse osmosis module; and
   a flow controller disposed on and controlling the drain line, disposed downstream from the reverse osmosis module and upstream from the shut-off mechanism, and directly coupled to and in fluid communication with the shut-off mechanism.

2. The apparatus of claim 1, wherein the semipermeable membrane and shut-off mechanism are configured to maintain purified water production without a booster pump.

3. The apparatus of claim 1, wherein the semipermeable membrane and shut-off mechanism are configured to maintain purified water production without a storage tank.

4. The apparatus of claim 1, further comprising a prefilter fluidically connected to the feed line.

5. The apparatus of claim 1, wherein the appliance comprises one of an ice machine, a coffee machine, a tea machine, a further beverage dispenser, an evaporative cooler, and an aquarium.

6. The apparatus of claim 1, wherein the reverse osmosis module comprises an interchangeable reverse osmosis cartridge.

7. The apparatus of claim 1, wherein the semipermeable membrane is spiral wound around a central perforated tube.

8. The apparatus of claim 1, further comprising a check value connected to the product line.

9. The apparatus of claim 1, further comprising a check value connected to the drain line.

10. The apparatus of claim 1, wherein the appliance is a point of use appliance and comprises one of an ice machine, a coffee machine and a tea machine.

11. The apparatus of claim 1, wherein the diaphragm and the contact disk are disposed at opposite ends of a piston.

12. A method for purifying water, comprising:
    initiating a flow of unpurified water by creating a pressure drop across a reverse osmosis system by activating a point of use appliance directly coupled to a pressure sensor configured to activate a shut-off mechanism, the pressure sensor including a diaphragm, pressure sensor contacts and a contact disk, the diaphragm and contact disk disposed at opposite ends of a piston,
    the activating a point of use appliance causing pressure on a product line to drop and the contact disk to release from contacting the pressure sensor contacts thereby activating a solenoid valve that activates the reverse osmosis system;
    producing purified water and a concentrate by directing the unpurified water through a semipermeable membrane by activating the point of use appliance;
    controlling flow of said concentrate produced by said reverse osmosis system and said flow of unpurified water using a flow controller disposed on and controlling a drain line disposed downstream from the semipermeable membrane and upstream from the shut-off mechanism, wherein the flow controller is directly coupled to and in fluid communication with the shut-off mechanism; and
    stopping production of purified water by increasing pressure across the reverse osmosis system.

13. The method of claim 12, wherein the flow of unpurified water is initiated at a pressure in a range of about 207 kPa and about 690 kPa (about 30 psi to about 100 psi).

14. The method of claim 13, wherein the range is between about 345 kPa and about 690 kPa (about 50 psi to about 100 psi).

15. The method of claim 12, further comprising providing purified water directly to the point of use appliance.

16. The method of claim 15, wherein the providing of purified water directly to the point of use appliance occurs without having to store purified water and occurs by activating the point of use appliance.

17. The method of claim 15, wherein the providing water directly to the point of use appliance occurs without having to pump purified water.

18. The method of claim 15, further comprising draining the concentrate.

19. The method of claim 12, wherein the point of use appliance comprises one of an ice machine, a coffee machine, a tea machine, an evaporative cooler, and an aquarium.

* * * * *